(12) United States Patent
Lemmon et al.

(10) Patent No.: US 6,321,687 B1
(45) Date of Patent: Nov. 27, 2001

(54) INDIVIDUAL ROOM DUCT AND VENTILATION SYSTEM FOR LIVESTOCK PRODUCTION BUILDING

(75) Inventors: Michael E. Lemmon; Charles M. Lemmon, both of Albion, IN (US)

(73) Assignee: Whiteshire/Hamroc LLC, Albion, IN (US)

( * ) Notice: Subject to any disclaimer, the term of this patent is extended or adjusted under 35 U.S.C. 154(b) by 0 days.

(21) Appl. No.: 09/362,383

(22) Filed: Jul. 28, 1999

(51) Int. Cl.⁷ ......................................................... A01K 1/00
(52) U.S. Cl. ................................................................ 119/448
(58) Field of Search ...................... 119/436, 448, 119/529

(56) References Cited

U.S. PATENT DOCUMENTS

| | | |
|---|---|---|
| Re. 3,317 | 3/1869 | Roberts . |
| 3,677,229 | 7/1972 | Blough et al. . |
| 3,938,428 * | 2/1976 | Van Huis ........................ 119/448 X |
| 4,249,461 | 2/1981 | Christenson et al. ................ 98/38 R |
| 4,292,927 * | 10/1981 | Sassmann ............................. 119/448 |
| 4,314,527 | 2/1982 | Shaw . |
| 4,334,577 | 6/1982 | George .................................... 165/54 |
| 4,426,918 | 1/1984 | Lambert ................................ 98/40 D |
| 5,036,797 | 8/1991 | Koozer . |
| 5,145,460 | 9/1992 | Smith, Jr. ............................. 454/253 |
| 5,492,082 | 2/1996 | Krevinghaus et al. . |
| 5,666,905 | 9/1997 | Mackin et al. ........................ 119/448 |

FOREIGN PATENT DOCUMENTS

| | | | |
|---|---|---|---|
| 294909 | * | 12/1988 | (EP) ..................................... 119/436 |

* cited by examiner

*Primary Examiner*—Robert P. Swiatek
(74) *Attorney, Agent, or Firm*—Baker & Daniels

(57) ABSTRACT

A duct and ventilation system for livestock production buildings. The building comprises a plurality of containment rooms for livestock, a pit beneath the room, an attic above the rooms, a ventilation duct for each room and a ventilation house coupled to the pit. The containment rooms have slatted floors. The attic includes a vent. Each ventilation duct includes a manually actuable air flow control valve. The ventilation house includes an exhaust fan and is adapted to draw air through the vent and through the attic to one of the ventilation ducts and into one of the rooms through the slatted floor and out via the ventilation house. The building may include a manifold area adjacent the rooms and in fluid communication with the attic. Ventilation ducts comprise a laminar polymer sheet having a generally rectangular shape and forming a corner generally parallel to first and second side edges, a second laminar and planar polymer sheet having a first edge and a second edge, and a plurality of brackets. The first edge of the second sheet attaches to the first sheet such that the second sheet is substantially parallel to the corner. The brackets position the first sheet and the second sheet in the room.

35 Claims, 9 Drawing Sheets

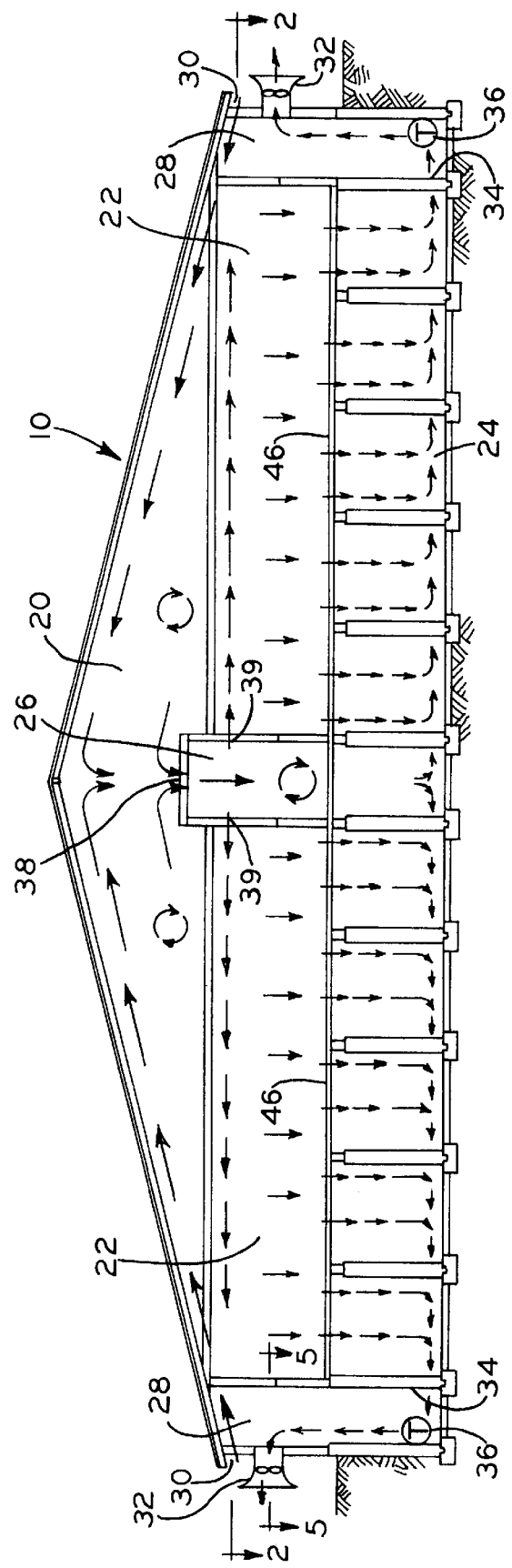
FIG_1

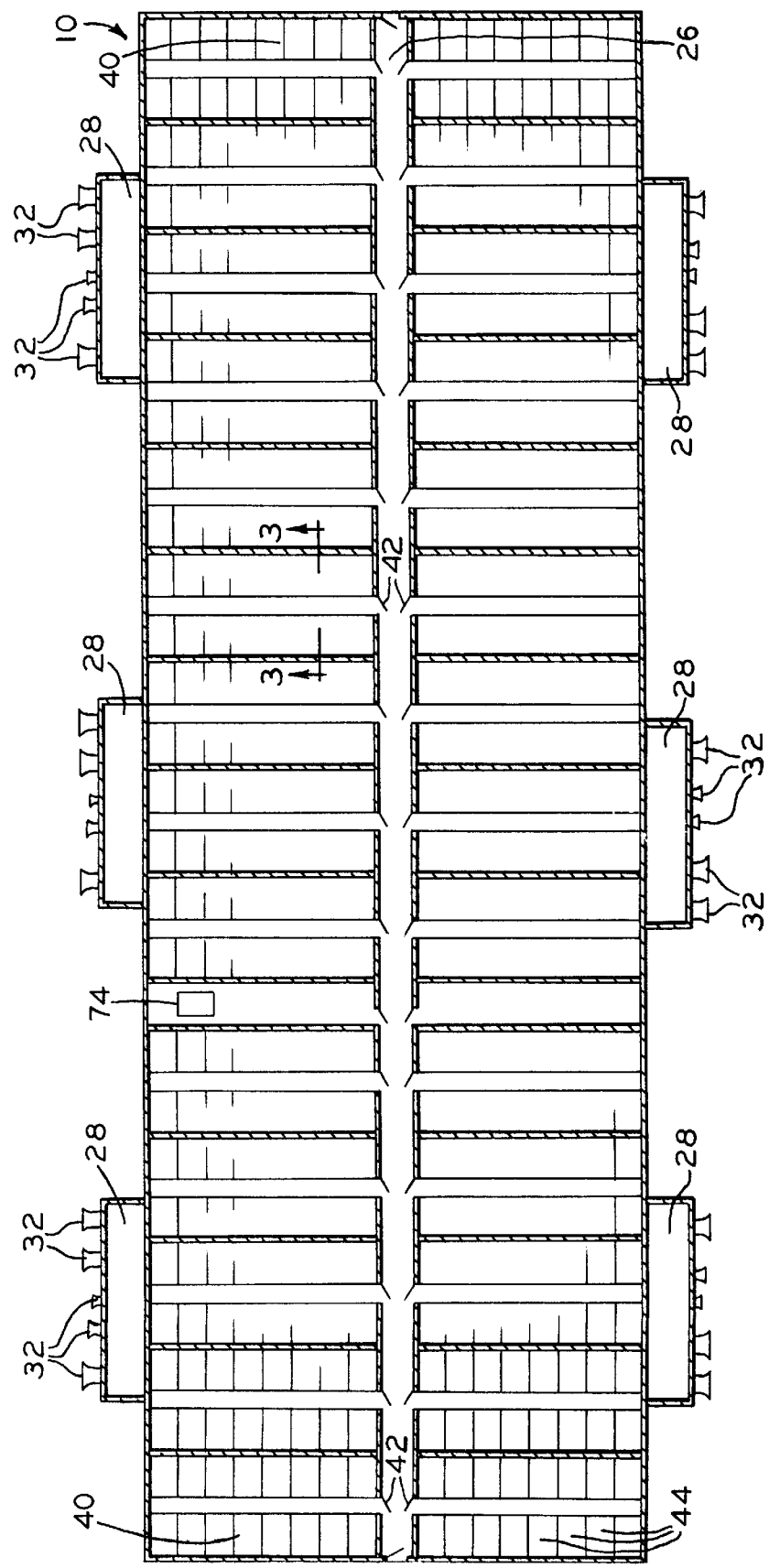
FIG_2

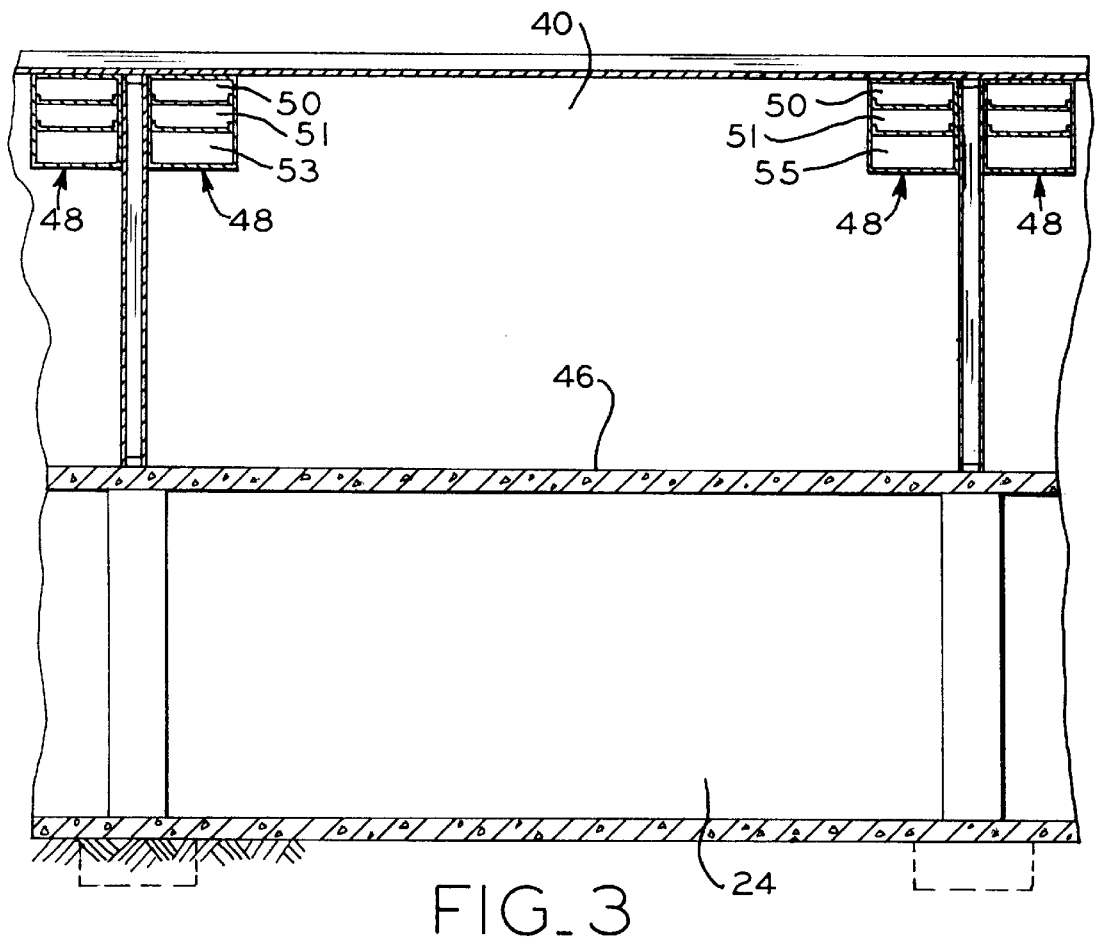
FIG_3
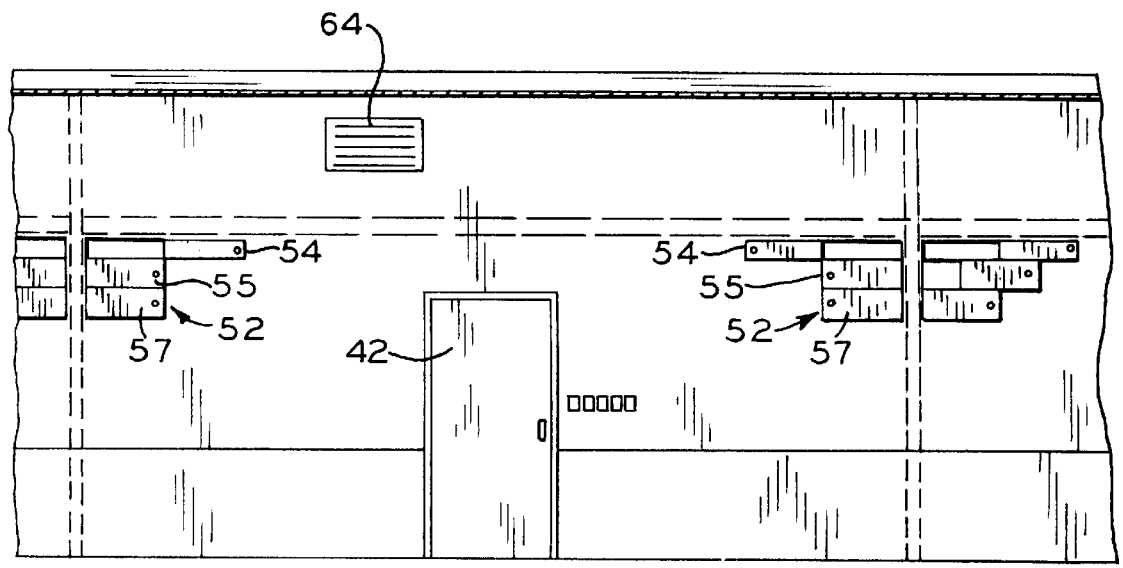
FIG_4A

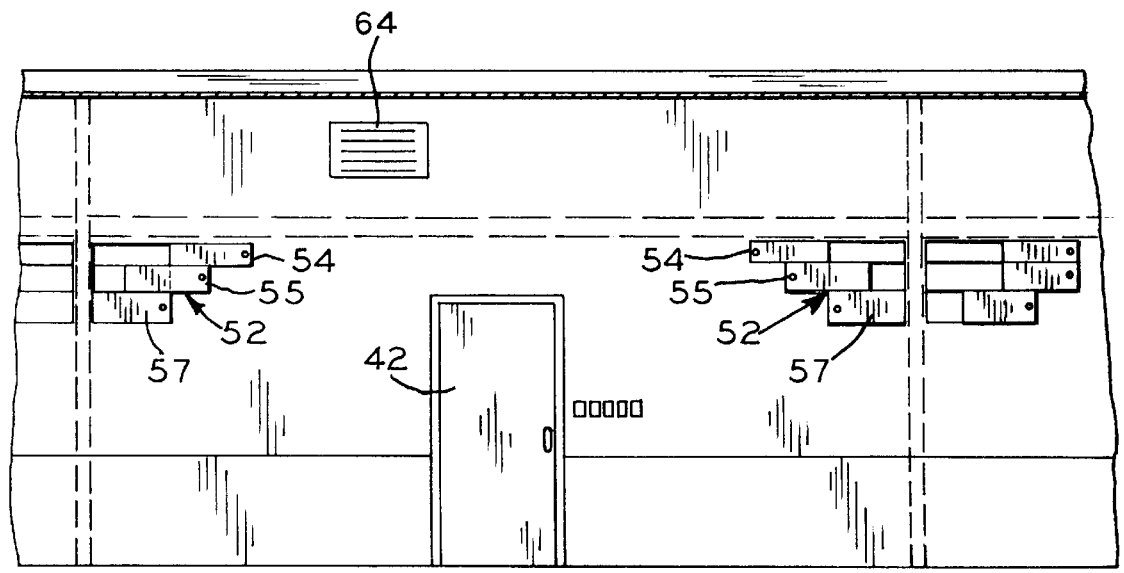
FIG_4B
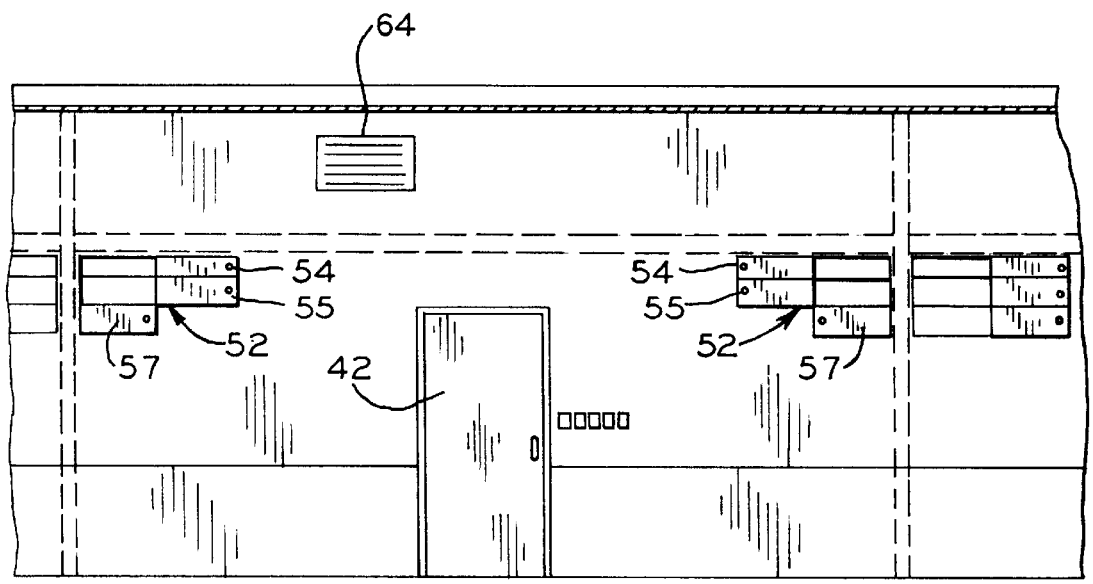
FIG_4C

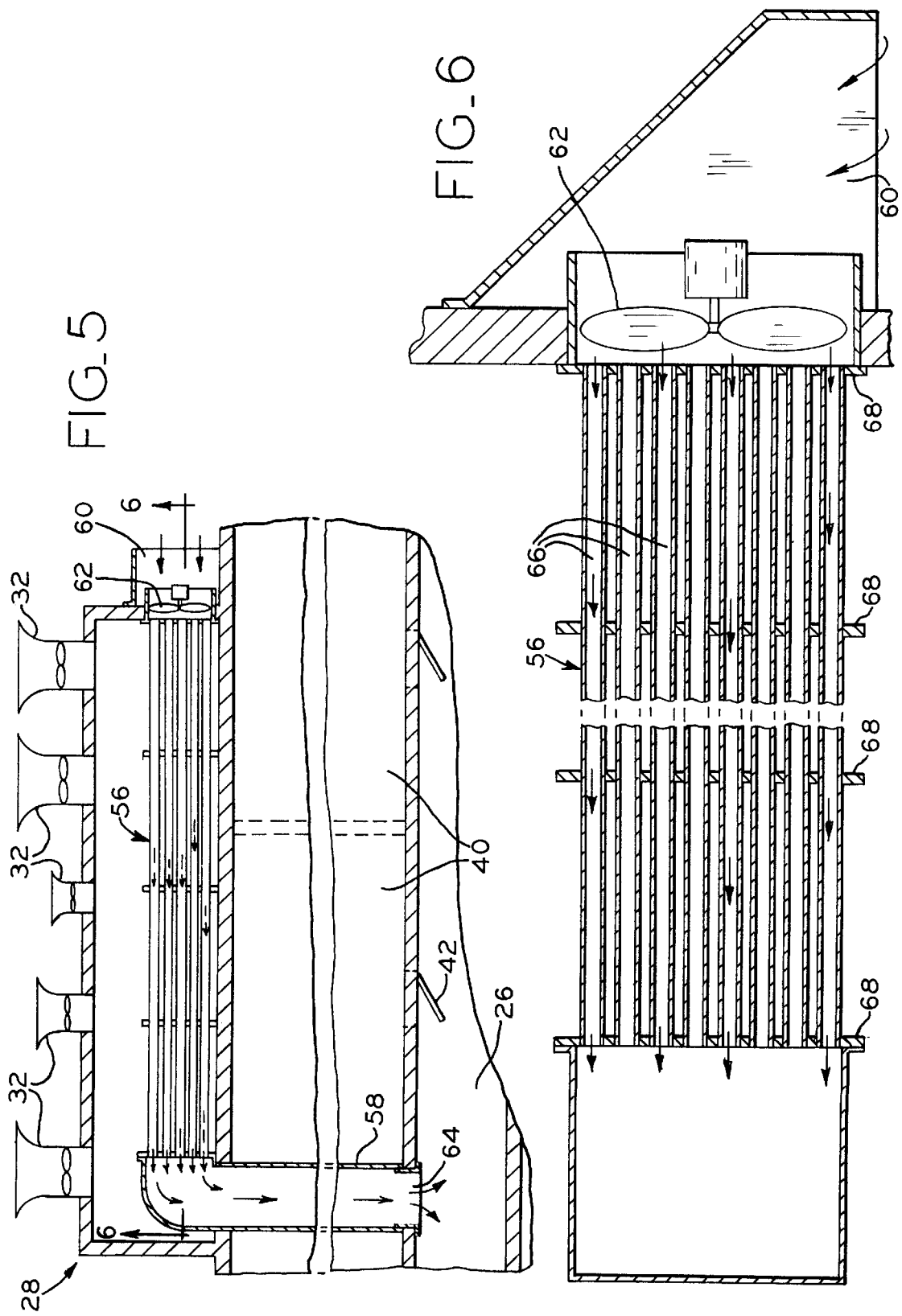

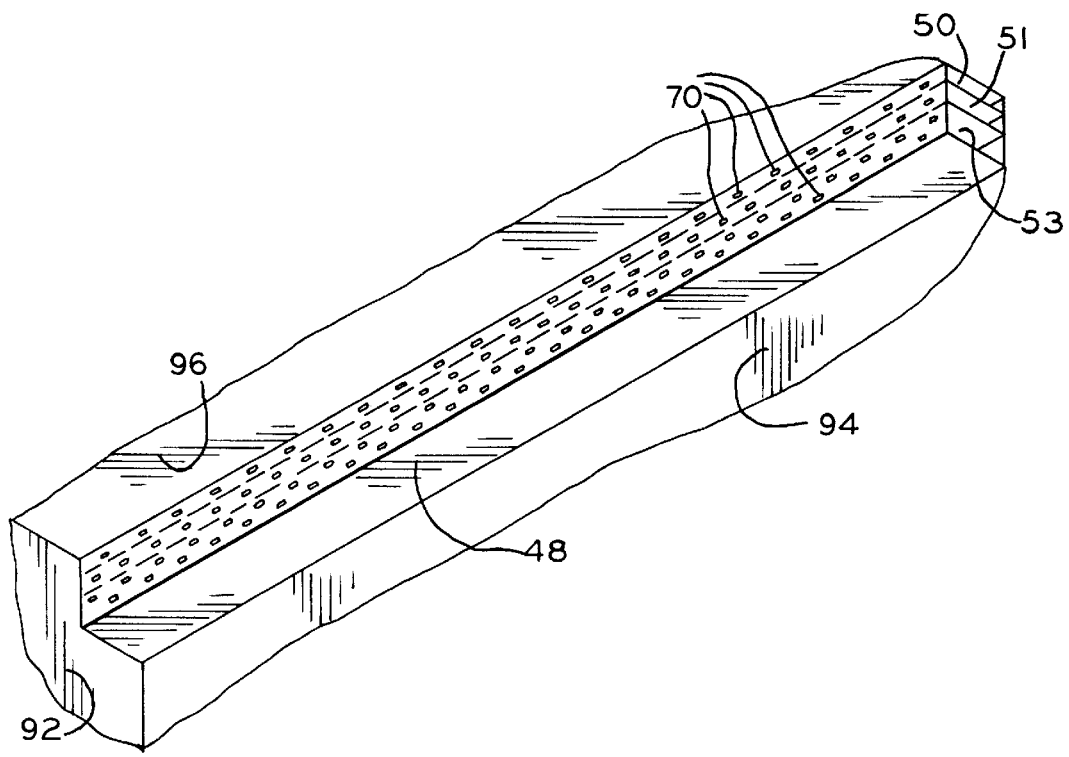
FIG_7
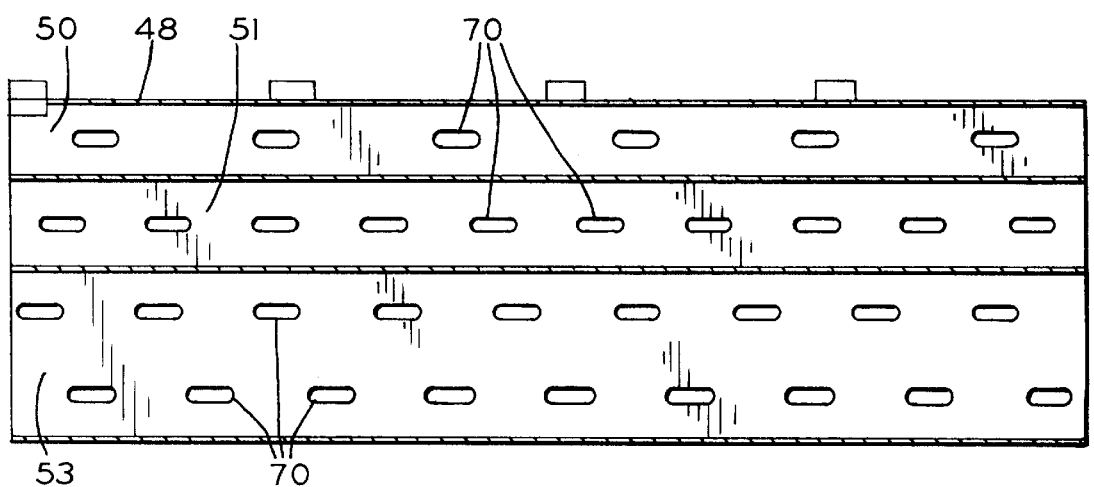
FIG_8

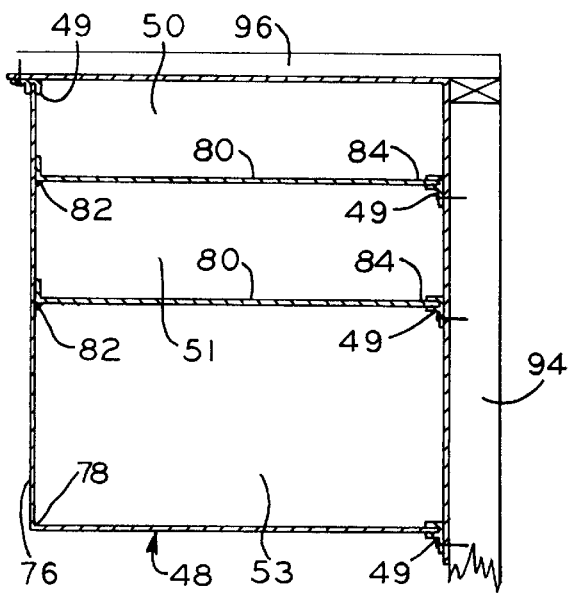
FIG_9
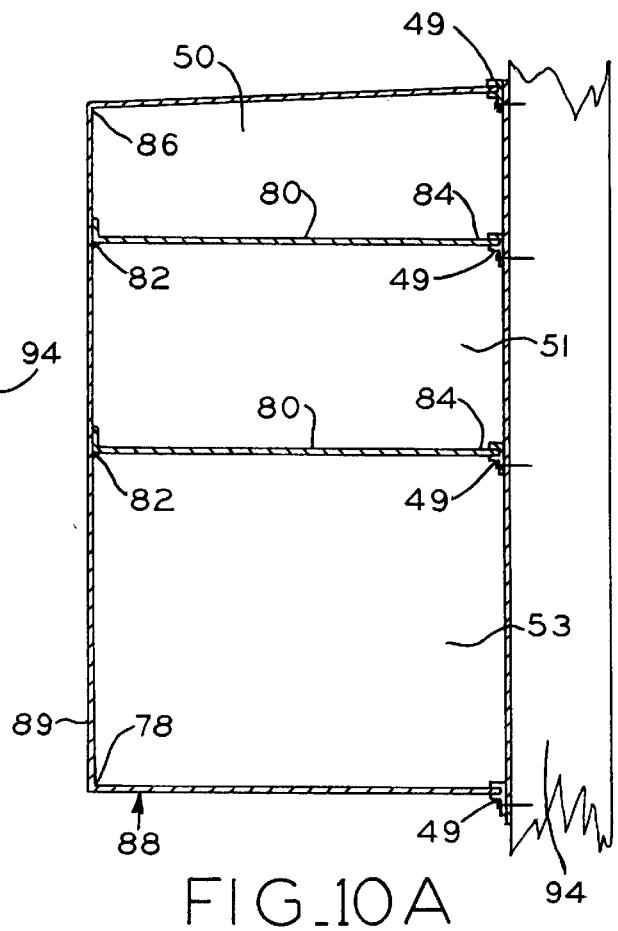
FIG_10A
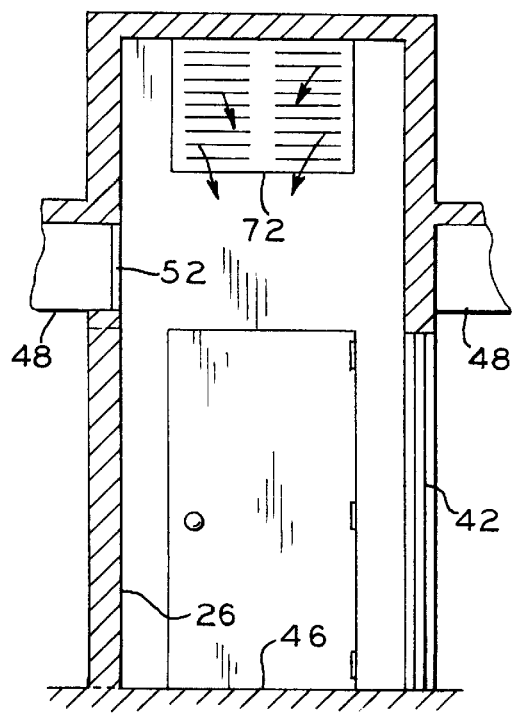
FIG_11
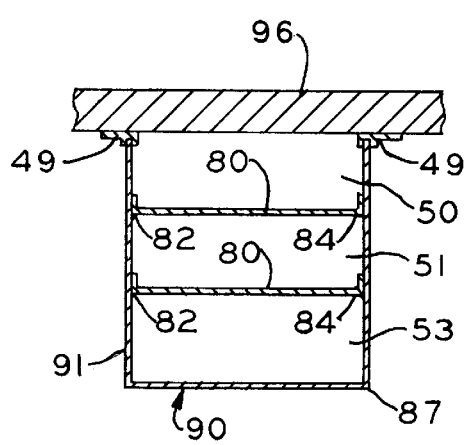
FIG_10B

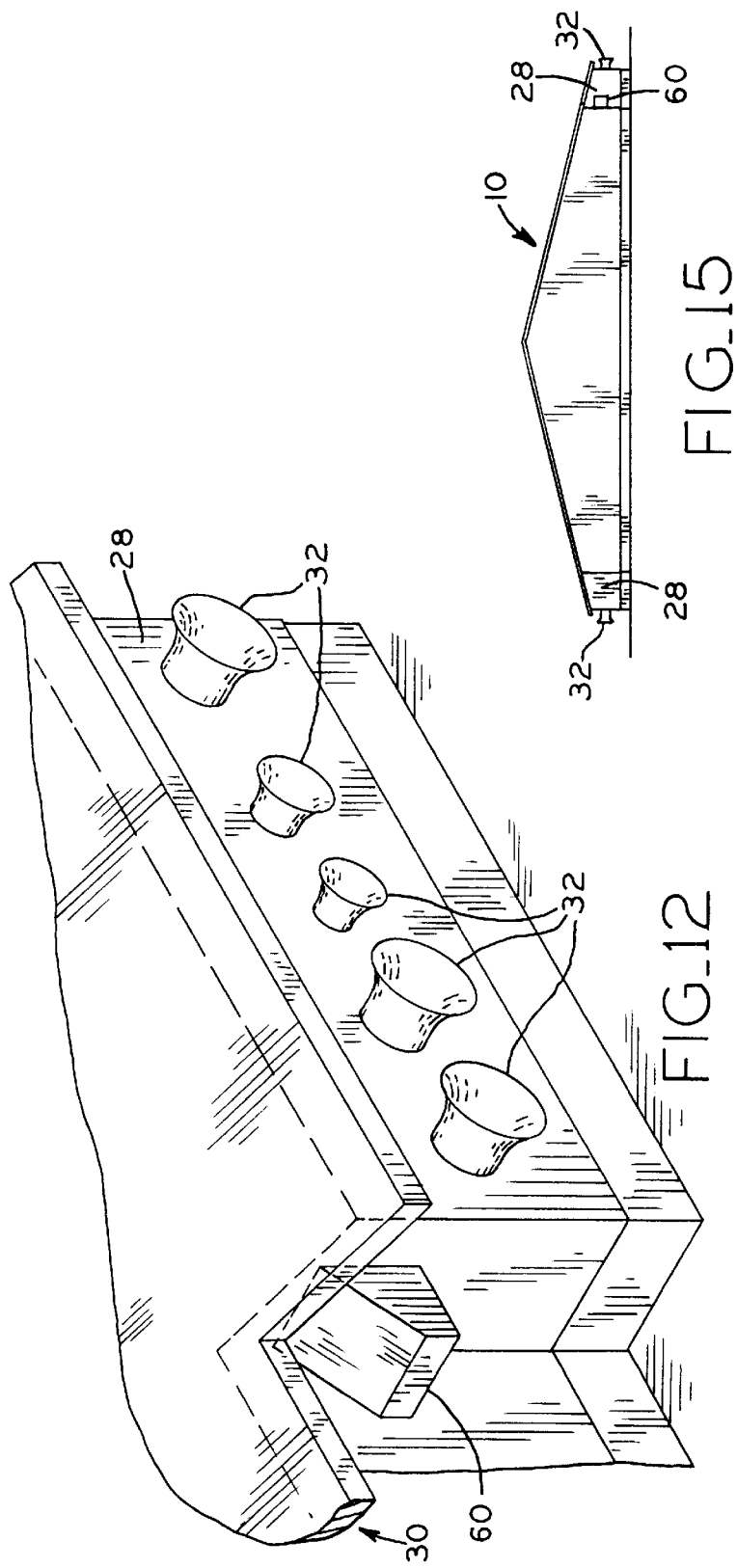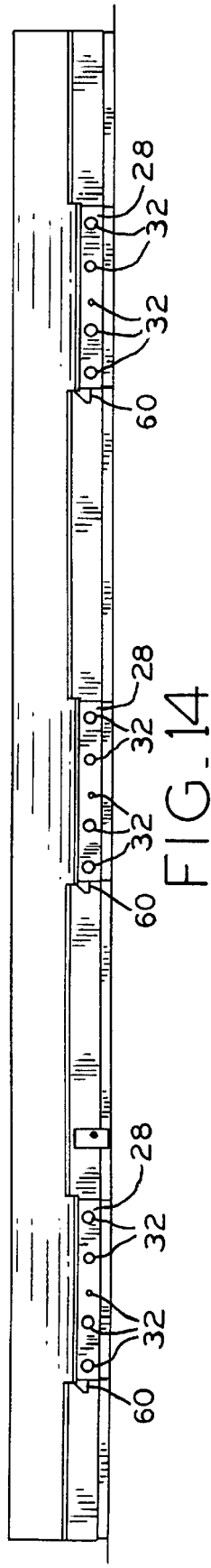

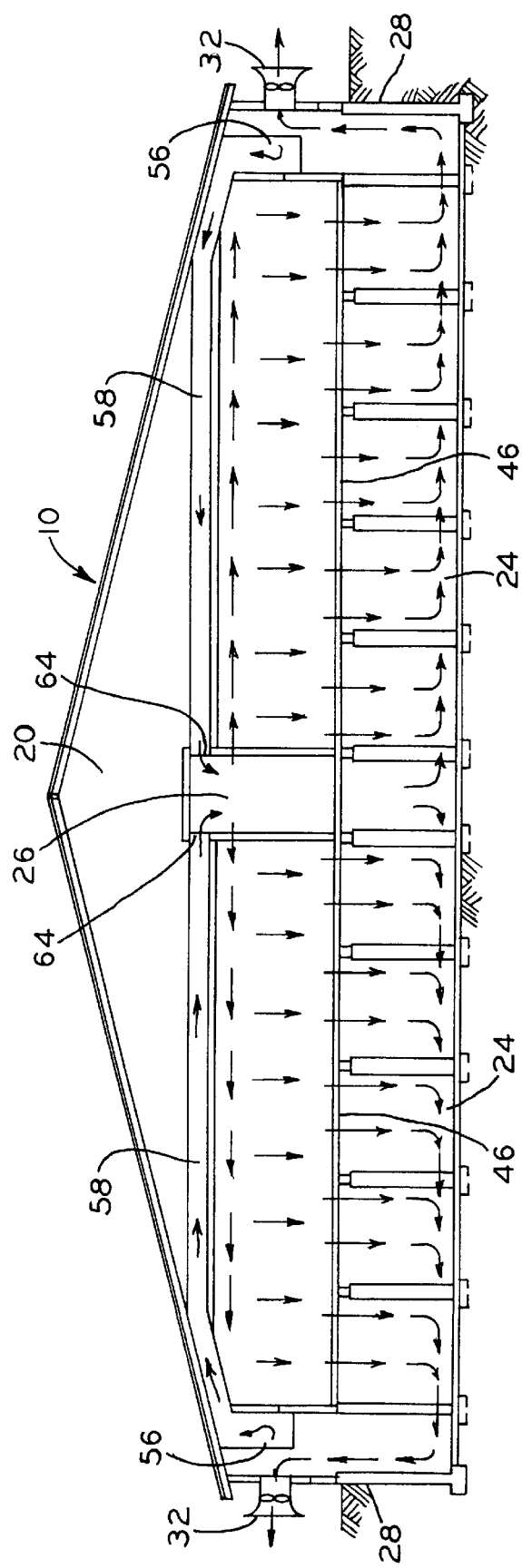
FIG_13

INDIVIDUAL ROOM DUCT AND VENTILATION SYSTEM FOR LIVESTOCK PRODUCTION BUILDING

BACKGROUND OF THE INVENTION

1. Field of the Invention

This invention relates to livestock production buildings and more particularly deals with production building ventilation and temperature control systems.

2. Background Art

The optimum feeding and finishing conditions for livestock and particularly hogs and pigs are a function of the total environment in which they live. Therefore, proper temperature and ventilation control are important to their growth, health and welfare. These same conditions are necessary to provide a comfortable and healthy working environment for the animal caretakers.

Additionally, it is important to provide cooling air to reduce or prevent temperature stress on the livestock. However, it is also important to avoid dramatic temperature changes which may in itself cause temperature shock or stress to the livestock. Therefore, as well as controlling the rate, velocity and direction it is important to facilitate the tempering of cooler intake air before it comes into contact with the livestock. During periods of hot weather, the combination of air temperature and the heat produced by the livestock requires a substantial volume of cooling air. The optimal ambient condition depends on the number, type and age of the livestock in the building, for example, younger and smaller pigs will require less cooling air because they put off less body heat and are not as closely confined.

Little cooling air is required during cold weather. Nevertheless minimal ventilation is still required to remove moisture and for the health of the livestock and the workers. Under cold weather conditions a minimum fresh air supply is required but the temperature of the fresh air must be controlled to prevent temperature shock to the livestock. This fresh air must also be evenly distributed throughout the pig space.

Current livestock ventilation apparatus have many inadequacies primarily due to the fact that ventilation apparatus merely draw a ventilating air flow through the buildings. Such apparatus failed to properly control the air flow velocity, rate and distribution of the incoming fresh air.

One known prior art apparatus discloses an animal production building with pit ventilation through a slatted floor using both intake and exhaust fan. Air is accumulated in the attic and is pushed and pulled through the ceiling past the animals into the pit.

Another known prior art apparatus discloses a livestock consignment house having a slatted floor, a disposal pit, and a reversible fan in the roof such that air can be pushed or pulled past the animals through the pit.

Yet another known prior art apparatus discloses a building ventilation system using pit ventilations having a plurality of openings in the ceiling which are selectively controlled by mechanically complex movable baffle device.

One problem with the existing livestock production buildings relates to the conditioning of the intake air. Often the blending and mixing of intake air fails to provide a constant temperature range or blends stale air with incoming fresh air.

Another problem with the existing livestock production buildings is the inability to individually control the ventilation for each of the rooms in the building except with multiple controllers and sensors.

Still another problem is the inability to distribute fresh air evenly and completely throughout the environment especially at minimum ventilation rates causing dead or stale air spots in the room.

Another problem of the current livestock production buildings relates to the uneven air flow in individual rooms especially at minimum ventilation rates.

Still another problem of the current livestock production buildings is the use of complex mechanical devices that will require maintenance.

Another problem of the current livestock production buildings is the loss of building heat with the exhaust air during cold weather.

SUMMARY OF THE INVENTION

The present invention provides for individual room ventilation and temperature control in a livestock production building with pit ventilation having a manifold area and/or manually actuable air flow control valve and ventilation ducts for each room.

The livestock production building of the present invention includes at least one ventilation house, an attic, a manifold area, a livestock containment area, and a pit below the livestock containment area. The ventilation house contains exhaust fans that pull intake air into the attic which is then provided to the manifold area. The manifold area allows the mixing and tempering of the intake air to a constant temperature before distributing the air to the livestock containment area. The livestock containment area includes a plurality of containment rooms, each having their own manually controllable flow valve. Each containment room includes a ventilation duct or ducts coupled to the flow control valve. The air from the ventilation ducts is distributed over the animals and pulled into the pit. The air in the pit is exhausted by the fans in the ventilation house. The ventilation house may also includes a heat exchanger directly coupled to the manifold area for use in colder weather.

One advantage of the present invention is the provision of a manifold area for tempering and mixing of the intake air to a constant temperature using all fresh air.

Another advantage of the present invention is the provision of manually actuable air flow control valve for each room to allow control of the ventilation in individual rooms depending upon the size and age of the livestock therein.

Another advantage of the present invention is the provision of a ventilation duct or ducts in each room for evenly distributing the air flow in the room.

Another advantage of the present invention is the provision of a duct system to carry and distribute fresh air evenly and completely throughout the environment.

Still another advantage of the present invention is the provision of a system free of mechanical actuators that require substantial maintenance.

Another advantage of the present invention is the use of one controller for a multiple room building.

Another advantage of the present invention is the provision of a heat recovery system that is integrated into the ventilation system. The heat recovery system is designed for minimal maintenance and long life.

The present invention provides a livestock production building comprising a plurality of containment rooms for livestock, a pit beneath the room, an attic above the room, a ventilation duct for each room and a ventilation house coupled to the pit. The containment rooms have slatted floors. The attic includes a vent. Each ventilation duct includes a manually actuable air flow control valve. The ventilation house includes an exhaust fan and is adapted to draw air through the vent and into the attic to one of the ventilation ducts and into the rooms through the slatted floor and out via the ventilation house.

The present invention also provides a livestock production building comprising a containment room for livestock, a pit beneath the room, an attic above the room, a ventilation duct coupled to the attic to distribute air to the room, and a ventilation house coupled to the pit. The containment room has slatted floors. The attic includes a vent. The ventilation duct defines a plurality of separate air passages which include a plurality of openings allowing air to flow into the room. The ventilation house includes an exhaust fan and is adapted to draw air through the vent and into the attic to one of the ventilation ducts and then to the room through the slatted floor and out via the ventilation house.

The present invention also provides a livestock production building comprising a plurality of containment rooms for livestock, a pit beneath the room, an attic above the room, a manifold area adjacent the room and include communication with the attic, a ventilation duct in each of the rooms to distribute air within the rooms and in fluid communication with the manifold area, and a ventilation house coupled to the pit. The containment rooms have slatted floors. The attic includes a vent. The ventilation house includes an exhaust fan and is adapted to draw air through the vent and into the attic, then into the manifold area to one of the ventilation ducts and into one of the rooms through the slatted floor and out via the ventilation house.

The present invention provides a duct for providing air distribution in a room having walls and a ceiling. The duct comprises first and second laminar polymer sheets and a plurality of brackets. The first polymer sheet has a generally rectangular shape and forms a comer generally parallel to the first and second side edges. The second polymer sheet has a first edge and a second edge with the first edge attached to the first polymer sheet such that the second sheet is substantially parallel to the comer. The brackets position the first sheet and the second sheet in the room.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 1 is a sectional end view of the inventive livestock production building showing the air flow in warm weather;

FIG. 2 is a top plan sectional view of the livestock production building taken along view lines 2—2 of FIG. 1;

FIG. 3 is a sectional side view of a containment room of FIGS. 1 and 2 as seen from inside the room;

FIG. 4A is a side view of a containment room from the manifold area with one panel of the air flow control valve completely open;

FIG. 4B is a side view of a containment room from the manifold area with one panel of the air flow control valve completely open and a second panel half open;

FIG. 4C is a side view of a containment room from the manifold area with two panels of the air flow control valve completely open;

FIG. 5 is a top plan sectional view taken along view lines 5—5 of FIG. 1;

FIG. 6 is a sectional view of the heat exchanger along view lines 6—6 of FIG. 5;

FIG. 7 is a perspective view of an air duct of the present invention mounted in a containment room;

FIG. 8 is a side view of the ventilation duct of FIG. 7;

FIG. 9 is a longitudinal sectional view of a ventilation duct attached to a wall and ceiling;

FIG. 10A is a longitudinal sectional view of a second embodiment of a ventilation duct attached to a wall;

FIG. 10B is a longitudinal sectional view of a third embodiment of a ventilation duct attached to a ceiling;

FIG. 11 is a perspective view of a heater in the manifold area;

FIG. 12 is a perspective view of the exterior of a representative ventilation house;

FIG. 13 is a sectional end view of a livestock production building showing the air flow in cold weather;

FIG. 14 is a side view of a representative livestock production building; and

FIG. 15 is an end view of a representative livestock production building.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF THE PRESENT INVENTION

The embodiment described herein is not intended to limit the scope of the invention to the precise form disclosed. Rather the embodiment has been chosen and described to explain the principles of the invention and its applications and practical use to best enable others skilled in the art to follow its teachings.

Referring first to FIG. 1, a livestock production building generally indicated by reference numeral 10 is shown illustrating the air flow pattern during warm weather. Livestock production building 10 includes attic 20, containment rooms 22, pit 24, manifold area 26, and ventilation house 28. Attic 20 includes inlet vents 30 and manifold area vent 38. Containment area 22 includes slatted floors 46 and room vent 39. Ventilation house 28 includes exhaust fans 32, pit opening 34, and temperature sensor 36. Temperature sensor 36 is located proximal pit opening 34 in ventilation house 28 for adaptive control of the exhaust 156 air temperature. Temperature sensor 36 may also be located in containment space 22.

In the hot weather configuration for temperatures in the range of, e.g., 60 to 105° F., fresh air is drawn through inlet vents 30 into attic 20 where some mixing and tempering are accomplished. The air is then induced into manifold area 26 and additional mixing and tempering are done. The air next is drawn into containment area 22 through room vent 39 providing air cooling and fresh air for the livestock (not shown) residing in containment area 22. As shown in FIG. 2, the containment area includes a plurality of containment rooms 40. Containment rooms 40 may include a plurality of pens 44 and door 42 to manifold area 26. The air then flows through slatted floors 46 of containment rooms 40 into pit 24 and through pit opening 34 into ventilation houses 28 and exhausted to the outside through exhaust fans 32. Controller 74 which controls exhaust fans 32 with input from temperature sensor 36 is shown in a separate room in livestock production building 10, but can be located elsewhere as long as controller 74 is operatively coupled to exhaust fans 32.

In accordance with one aspect of the present invention, each containment room 40 includes an air duct to evenly distribute the air over the livestock in room 40. The sectional view in FIG. 3 shows containment room 40 having air ducts 48 running the length of room 40 with three air passages 50, 51, 53. The air flows into containment room 40 through air ducts 48 and air is distributed over the livestock in containment room 40 through slatted floor 46 and then pulled out through pit 24 by exhaust fan 32.

Air ducts 48 are shown mounted to the wall and ceiling in the upper corners of room 40. However, other locations are possible such as mounted only to the wall lower than the present location or mounted only to the ceiling located away from the walls. Additional air ducts can also be added such as one in the center of a room with air ducts on both sides. The overall size of air ducts 48 will vary due to the size of the room and the amount of ventilation required.

Air passages 50, 51, 53 are rectangular and vary in sizes with air passage 50 the smallest and air passage 53 the largest as shown in FIG. 9. Each of air passages 50, 51, 53 in FIG. 8 include a plurality of openings 70 to allow air to flow into room 40. Air passage 50 includes the fewest number of openings 70 and air passage 53 includes the most number of openings 70. The higher the number of openings 70, the higher the flow rate can be. Openings 70 are evenly distributed on each of air passages 50, 51, 53 to evenly distribute the air in room 40. Openings 70 are shown as generally oblong horizontal openings but may take other shapes or orientations due to the application or preferences.

The air flows evenly out of openings 70 because exhaust fan 32 keeps the air pressure in room 40 lower than the air pressure in the operating passages of air duct 48. The air at the higher pressure in air duct 48 flows evenly out of opening 70 over the livestock in room 40. Therefore, separate air passages allow the distribution of air uniformly under all conditions. When minimal air flow is required only air passage 50 will be utilized. As seen in FIG. 8, air passage 50 has the least number of openings 70 allowing uniform distribution of air in room 40 at low air flow. When higher air flows are required, the other air passages 51, 53 can be used separately or together each with an increasing number of openings 70 to evenly distribute the air in room 40 at the increasing flow rate.

In FIG. 7, air duct 48 is shown attached to ceiling 96 and wall 94 of containment room 40 and having three passages 50, 51, 53 and a plurality of air openings 70. Air duct 48 also couples with airflow control valve 52 at front wall 92 of containment room 40. Air duct 48 as seen in FIG. 8 includes a plurality of air openings 70 each with their own air opening collar 71 for added strength.

FIGS. 9–10B illustrate alternative air ducts depending on their attachment to either a wall or a ceiling or both. The air ducts described herein are fabricated of a corrosion free fluted polymer, such as polypropylene, which makes the ducts low cost and lightweight, requiring little support, cleanable, and easily customized. Each duct is engineered and designed for a specific use and purpose with overall duct size, inlets and outlet sizing very critical to the specific applications. Since the ducts are lightweight and easily customized, installation is easy requiring fastening brackets to wall and/or ceiling and attaching the ducts to the bracket.

In FIG. 9 air duct 48 is installed to both a wall 94 and ceiling 96. Air duct 48 includes outer sheet 76, divider sheets 80, and brackets 49. Outer sheet 76 is bent to form corner 78 and divider sheets 80 are attached to the outer sheet such that they are parallel to corner 78. Divider sheets 80 have first edge 82 which is bent in an L-shape for attachment to outer sheet 78 using a fastener such as glue, screws, rivets or staples. Brackets 49 are used to attach outer sheet 76 to the ceiling and the wall and second edges 84 of divider sheets 80 to the wall. Divider sheets 80 can be added or deleted to create more or fewer air passages. Wall 94 and ceiling 96 form two sides of air duct 48.

In FIG. 10A air duct 88 is attached only to wall 94. Air duct 88 includes outer sheet 89, divider sheets 80, and brackets 49. In this case outer sheet 89 includes two corners 78 and 86. Divider sheets 80 are again attached to outer sheet 89 such that they are parallel to corners 78, 86. Brackets 49 are again used to attach outer sheet 89 and divider sheets 80 to wall 94. Wall 94 forms one side of air duct 88.

Air duct 90 as seen in FIG. I OB is attached only to ceiling 96. Air duct 90 includes outer sheet 91, divider sheets 80, and brackets 49. Outer sheet 91 is again bent to have two corners 78 and 87. Divider sheets 80 have two edges 82 and 84 which are both bent in an L-shape and both edges 82 and 84 are attached to outer shell 91 such that they are parallel to corners 78, 87. Brackets 49 are then used to attach outer shell 91 to ceiling 96. Ceiling 96 forms one side of air duct 90.

In accordance with another aspect of the present invention, FIGS. 4A through 4C show containment room 40 having airflow control valve 52 to control the environment in room 40 depending on the livestock age, size, and type. Airflow control valve 52 includes three sliding panels 54, 55, 57 to control the airflow into passages 50, 51, and 53 of air duct 48. In controlling the air flow into the operating passage, the air pressure in that operating passage is also controlled. When the sliding panel is completely closed allowing no air flow into the passage, the pressure in that passage is approximately that of the pressure in room 40 and no air flows from that passage to room 40. When the sliding panel is completely open, the pressure in that operating passage is approximately the pressure in manifold area 26 and the maximum air flow for that air passage flows out of openings 70 into room 40. When the sliding panel is partially open, the pressure in the air passage is changed and the air flow out openings 70 ranges from zero to maximum.

The airflow control valve in FIG. 4A shows top sliding panel 54 completely open and middle and bottom panels 55 and 57 closed which would allow air to flow only into the top air passage 50 of air duct 48. In FIG. 4B the airflow control valve 52 again shows the top sliding panel 54 completely open and the middle sliding panel 55 partially open thus allowing total airflow into the top air passage 50 of air duct 48 and partial airflow into the middle air passage 51 of air duct 48. The air flow control valve 52 in FIG. 4C shows both top and middle sliding panels 54 and 55, respectively, completely open allowing total airflow into the top and middle air passages 50 and 51 of air duct 48. Any of the three sliding panels 54, 55, and 57 can be partially or completely open. The arrangement of panels 54, 55, and 57 may be varied dependent on the desired temperature and livestock age, size, and type. Door 42 provides access to room 40 from manifold area 26.

Referring now to FIGS. 5 and 6, ventilation house 28 includes at least one exhaust fan 32 and, for colder climates, heat exchanger 56. Heat exchanger 56 includes inlet 60, inlet fan 62, a plurality of heat exchanger tubes 66, a plurality of heat exchanger brackets 68 and heat exchanger duct 58. In cold weather, inlet fan 62 pushes air through tubes 66 and into duct 58 and out through vent 64 into manifold area 26. The air flowing through tubes 66 is warmed by the exhaust air from pit 24 traveling through ventilation house 28 and out through exhaust fan 32. Now referring to FIG. 11, manifold area 26 may further include heater 72. Heater 72 is used during cold weather to increase the temperature of the air in manifold area 26 prior to being distributed through air flow control valve 52 into containment room 40.

FIG. 13 illustrates the air flow pattern in cold weather in livestock production building. Warmed exhaust air is pulled through heat exchanger 56 by exhaust fans 32 and warms heat exchanger 56 and the air drawn through tubes 66. Air is pushed into heat exchanger 56 by inlet fan 62 through inlet 60. Upon passing through heat exchanger 56, the warmed air will flow through heat exchanger duct 58 into manifold area 26. The air will then be distributed to containment rooms 40 and then pulled down over the animals through slatted floor 46 into pit 24 and then out through ventilation house 28 through heat exchanger 56 once again warming the air in heat exchanger 56 and then out through exhaust fan 32. In this manner some of the exhausted heat is recovered and used to warm the incoming air.

FIG. 12 shows ventilation house 28 including a plurality of exhaust fans 32 of various sizes and winter inlet 60 for heat exchanger 56. Having a large central fan reduces the amount of operating equipment required, because during winter months only minimal ventilation is needed to remove moisture and a single fan is sufficient for ventilation purposes. Livestock production building 10 as seen in FIGS. 14 and 15 can include a plurality of ventilation houses 28 on each side of building 10.

Controller 74 may utilize temperature sensor 36 to control exhaust fans 32, inlet fan 62, and heater 72 to keep the exhaust temperature in a narrow range. In warm weather, controller 74 may regulate the volume of air exhausted by exhaust fans 32 to cool livestock production building 10. In cold weather, controller 74 may utilize inlet fan 62 to push air through heat exchanger 56 and/or heater 72 to warm the fresh inlet air of livestock production building 10.

In accordance with another aspect of the present invention, manifold area 26 is used for the mixing/blending and tempering of the incoming air to a uniform temperature. Manifold area 26 receives air from attic 20 and/or heat exchanger duct 58. In cold weather, heater 72 can be used to supplement heating from heat exchanger 56. The air in manifold area 26 is then pulled into containment rooms 40 through airflow control valve 52 and distributed over the livestock via air ducts 48. One advantage of manifold area 26 is that it is a better and more controllable area to blend the air than attic 20 especially when adding heat with heat exchanger 56 or heater 72. Manifold area 26 is insulated from the outside by containment rooms 40, attic 20 and pit 24. The ease of controlling air flow control valve 52 in manifold area 26 is another advantage.

While this invention has been described as having different embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A livestock production building, comprising:
    a plurality of containment rooms for livestock, said rooms having slatted floors;
    a pit beneath said rooms;
    an attic above said rooms, said attic including a vent;
    a ventilation duct for each of said rooms, each said ventilation duct including a manually actuable airflow control valve; and
    a ventilation house coupled to said pit, said ventilation house including an exhaust fan and adapted to draw air through said vent and into said attic, into one of said ventilation ducts and into a corresponding one of said rooms, through a corresponding one of said slatted floors, and out via said ventilation house.

2. The livestock production building of claim 1, wherein said vent includes an eave vent.

3. The livestock production building of claim 1, wherein said containment rooms include a plurality of pens.

4. The livestock production building of claim 1, wherein said airflow control valve includes a sliding panel for said ventilation duct.

5. The livestock production building of claim 4, wherein said ventilation duct includes a plurality of air passages.

6. The livestock production building of claim 5, wherein said airflow control valve includes said sliding panel for each of said air passages.

7. The livestock production building of claim 1, wherein said ventilation house includes a temperature sensor located near said pit.

8. The livestock production building of claim 7, further comprising a controller, said controller in communication with said exhaust fan and said temperature sensor.

9. The livestock production building of claim 1, wherein said ventilation house includes a heat exchanger.

10. The livestock production building of claim 9, wherein said ventilation house includes an inlet having an intake fan arranged to blow air through said heat exchanger.

11. The livestock production building of claim 9, wherein said heat exchanger includes a plurality of tubes and a plurality of brackets engaging said tubes.

12. The livestock production building of claim 1, further comprising a heater located in the airflow control valve.

13. A livestock production building, comprising:
    a containment room for livestock, said room having a slatted floor;
    a pit beneath said room;
    an attic above said room, said attic including a vent;
    a ventilation duct coupled to said attic to distribute air to said room, said ventilation duct defining a plurality of separate air passages, said passages including a plurality of openings allowing air to flow into said room; and
    a ventilation house coupled to said pit, said ventilation house including a heat exchanger and an exhaust fan and adapted to draw air through said vent and into said attic, into said ventilation duct and into said room, through said slatted floor, and out via said ventilation house.

14. The livestock production building of claim 13, wherein said vent includes an eave vent.

15. The livestock production building of claim 13, wherein said containment room include a plurality of pens.

16. The livestock production building of claim 13, wherein said ventilation house includes a temperature sensor located near said pit.

17. The livestock production building of claim 16, further comprising a controller, said controller in communication with said exhaust fan and said temperature sensor.

18. The livestock production building of claim 13, wherein said ventilation house includes an intake fan arranged to blow air through said heat exchanger.

19. The livestock production building of claim 13, wherein said heat exchanger includes a plurality of tubes and a plurality of brackets engaging said tubes.

20. The livestock production building of claim 13, further comprising a heat exchanger duct connecting said heat exchanger to said ventilation duct.

21. The livestock production building of claim 20, further comprising a heater coupled to said heat exchanger duct.

22. A livestock production building, comprising:
- a plurality of containment rooms for livestock, said rooms having slatted floors;
- a pit beneath said rooms;
- an attic above said rooms, said attic including a vent;
- a manifold area adjacent said rooms and in fluid communication with said attic;
- a ventilation duct in each of said rooms to distribute air within said rooms and in fluid communication with said manifold area;
- an airflow control valve for each of said rooms controlling airflow from said manifold area into a respective one of said rooms; and
- a ventilation house coupled to said pit, said ventilation house including an exhaust fan and adapted to draw air through said vent and into said attic, then into said manifold area and into one of said ventilation ducts and into a corresponding one of said rooms, through a corresponding one of said slatted floors, and out via said ventilation house.

23. The livestock production building of claim 22, wherein said vent includes an eave vent.

24. The livestock production building of claim 22, wherein said airflow control valve includes a sliding panel for said ventilation duct.

25. The livestock production building of claim 24, wherein said ventilation duct includes a plurality of air passages.

26. The livestock production building of claim 25, wherein said airflow control valve includes said sliding panel for each of said air passages.

27. The livestock production building of claim 22 wherein said containment rooms include a plurality of pens.

28. The livestock production building of claim 22, wherein said ventilation house includes a temperature sensor located near said pit.

29. The livestock production building of claim 28, further comprising a controller, said controller in communication with said exhaust fan and said temperature sensor.

30. The livestock production building of claim 29, wherein said ventilation house includes a heat exchanger.

31. The livestock production building of claim 30, wherein said ventilation house includes an inlet having an intake fan arranged to blow air through said heat exchanger.

32. The livestock production building of claim 30, wherein said heat exchanger includes a plurality of tubes and a plurality of brackets engaging said tubes.

33. The livestock production building of claim 30, further comprising a heat exchanger duct connecting said heat exchanger to said manifold area.

34. The livestock production building of claim 22, further comprising a heater located in said manifold area.

35. The livestock production building of claim 34 wherein said controller is in communication with said intake fan and said heater.

* * * * *